(No Model.)
A. ROGERS.
POST HOLE DIGGER.
No. 283,282. Patented Aug. 14, 1883.
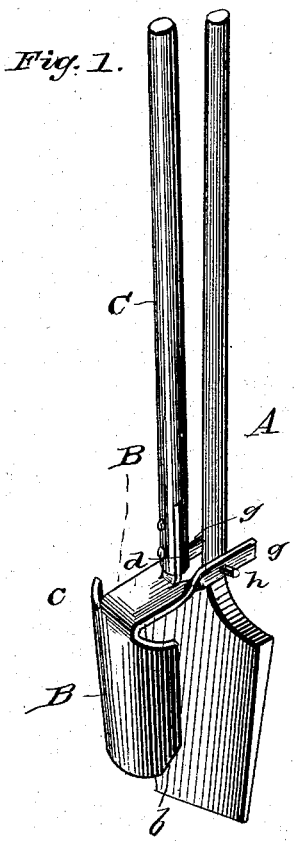
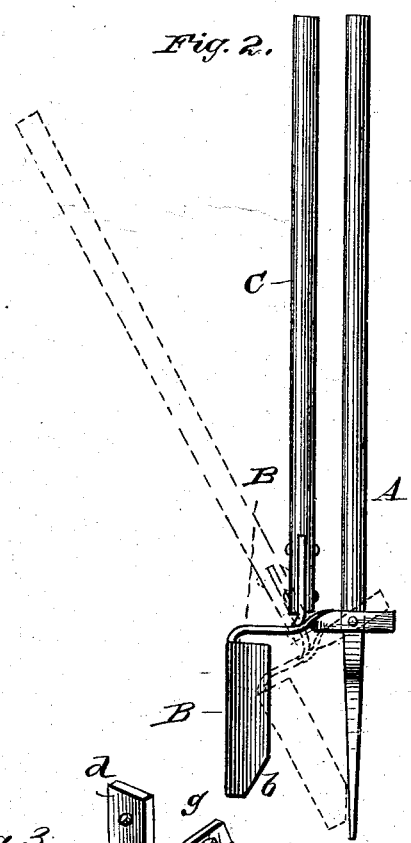
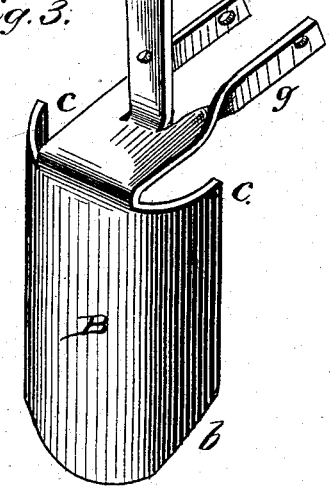
WITNESSES
INVENTOR
Arthur Rogers.
by
W H Alexander
Attorney

UNITED STATES PATENT OFFICE.

ARTHUR ROGERS, OF BARNESVILLE, OHIO.

POST-HOLE DIGGER.

SPECIFICATION forming part of Letters Patent No. 283,282, dated August 14, 1883.

Application filed April 16, 1883. (No model.)

*To all whom it may concern:*

Be it known that I, A. ROGERS, of Barnesville, Ohio, have invented certain new and useful Improvements in Post-Hole Diggers; and I do hereby declare that the following is a full, clear, and exact description thereof, reference being had to the accompanying drawings, and to the letters of reference marked thereon, which form part of this specification, in which—

Figure 1 is a perspective view of a straight spade having a shovel combined with it for the purpose of digging post-holes and removing the earth. Fig. 2 is a side elevation of my combined spade and shovel, showing the blades in two positions by the aid of dotted lines. Fig. 3 is a perspective view of the shovel detached from its handle and the handle of the spade.

This invention relates to implements which are designed for digging post-holes, especially in hard or stony ground; and it consists, mainly, in the combination, with the old well-known straight post-hole spade or digger, of a shovel which is constructed and pivoted to its handle or staff, as will be fully understood from the following description, when taken in connection with the annexed drawings.

A designates the well-known hand post-hole digger or spade, which consists of a strong flat blade rigidly secured to a straight handle. This is the kind of spade which is constructed especially for digging post-holes either in hard or soft ground.

B designates the shovel, which is rigidly secured to a straight handle, C, and is pivoted to the handle of the spade just above the shoulders of the spade. The shovel B consists of a blade, $a$, which is made concave, and may have beveled edges $b$ $b$ at its lower part, which are adapted to lie snugly against the surface of the spade during the act of removing the loose earth from a post-hole, which position is indicated by dotted lines, Fig. 2. The head $c$, or upper end of the shovel, is usually constructed with a tang, $d$, which enters the lower end of the handle C, and is rigidly secured to it by any suitable means. The head $c$ of the shovel is also usually constructed with two arms or jaws, $g$ $g$, (though it may be constructed with one,) which are received on opposite sides of the handle of the spade A, just above the shoulders of the flat blade thereof, and are connected to this handle by means of a transverse bolt, $h$, which forms the fulcrum or pivotal connection for the shovel-blade and its handle. The head and arms of the shovel afford a short lever, which is at right angles to the handle that forms the long lever. I thus have a powerful leverage, which allows the shovel-blade to be moved easily toward the blade of the spade during the act of grasping loose earth in the post-hole. The shovel is so constructed that when the two handles are brought together the shovel and spade blades are parallel, or nearly so, to each other, as shown in Fig. 2. It will also be seen by reference to this figure that in the position last named of the parts the shovel is much shorter than the spade, or, in other words, that the spade extends so far below the lower end of the shovel that the former can be conveniently used without interfering with the latter. When the two blades are closed for lifting the loose earth out of the hole, the lower ends of these blades are nearly together, owing to the movement of the head and arms or short lever of the shovel and the point of pivoting the same to the spade.

Having thus fully described my invention, what I claim as new, and desire to secure by Letters Patent, is—

The combination of the concave shovel B, arms $g$ on the angular head thereof, the tang $d$, also formed on said head, the handle C, secured to this head, and a straight digging-spade pivoted to the said arms, all constructed and adapted to operate substantially in the manner and for the purposes described.

In testimony that I claim the foregoing as my own I affix my signature in presence of two witnesses.

ARTHUR ROGERS.

Witnesses:
ALONZO HICKS,
JOHN M. GARDNER.